Figure 1:
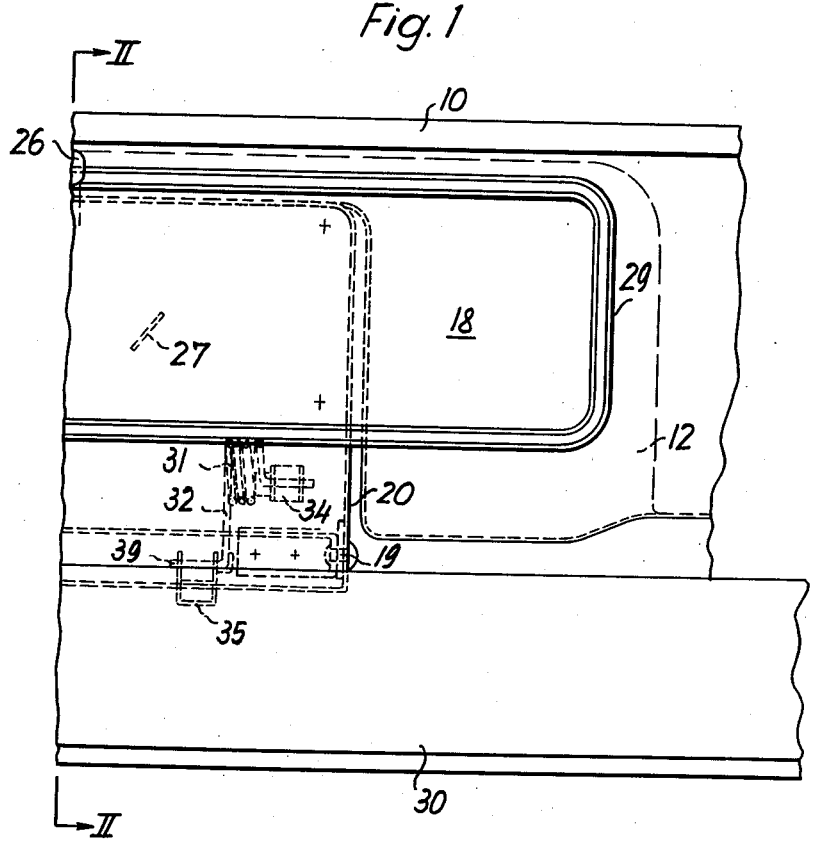

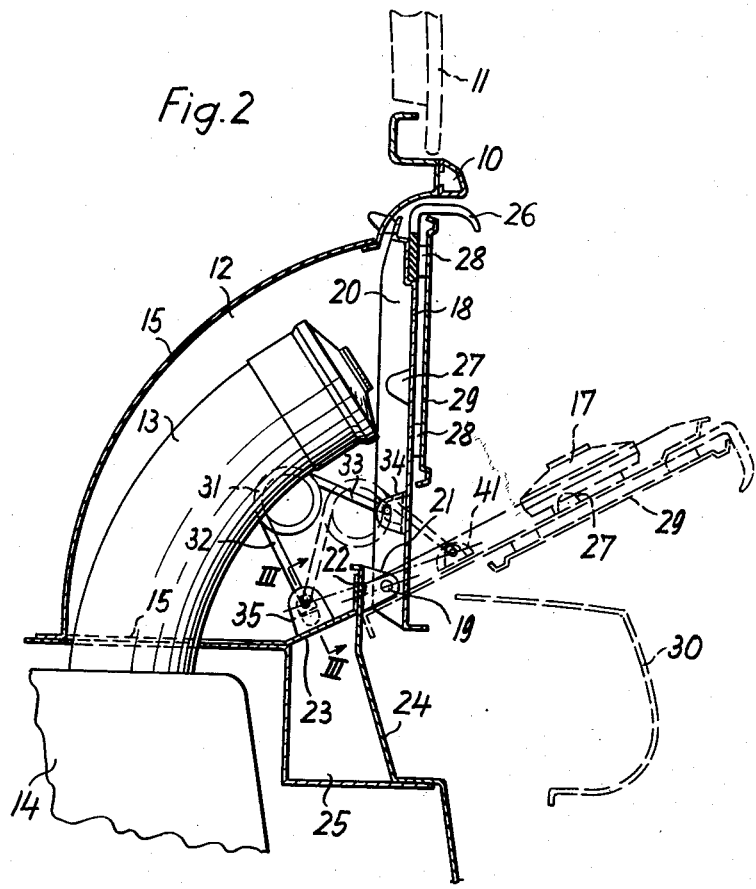
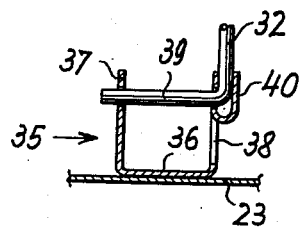

United States Patent Office 3,008,754
Patented Nov. 14, 1961

3,008,754
LID COVERING A RECESS PROVIDED IN THE BODY OF A MOTOR VEHICLE AND CONTAINING A FILLING OPENING OF THE FUEL TANK
Ernst J. H. Fiala, Sindelfingen, Kreis Boblingen, Germany, assignor to Daimler-Benz Aktiengesellschaft, Stuttgart-Unterturkheim, Germany
Filed Nov. 19, 1959, Ser. No. 854,177
Claims priority, application Germany Nov. 19, 1958
7 Claims. (Cl. 296—1)

My invention relates to a lid covering a recess which is provided in the body of a motor vehicle and affords access to the filling opening of the fuel tank. It is the object of my invention to provide means ensuring that the lid will be closed automatically after the fuel tank has been filled, under the effect of vibrations occurring in operation of the motor vehicle. It is another object of my invention to provide means ensuring that the filling station attendant will not forget to place the cover on the filling opening before closing the lid. Finally it is an object of my invention to provide spring means of simple and rugged structure for automatically closing the lid when the vehicle is started after the fuel tank has been filled.

Further objects of my invention will appear from a detailed description of a preferred embodiment of my invention following hereinafter with reference to the accompanying drawings. It is to be understood, however, that my invention is in no way limited to such details but is capable of numerous modifications within the scope of the appended claims and that the terms and phrases used in such detailed description have been chosen for the purpose of explaining rather than that of restricting or limiting my invention.

In the drawings:
FIG. 1 is a partial rear view of a motor vehicle showing a half section of my improved lid and of a license plate secured thereto.
FIG. 2 is a sectional view, the section being taken along the plane indicated by line II—II in FIG. 1, and
FIG. 3 is a partial sectional view, the section being taken along the plane indicated by the line III—III in FIG. 2.

As shown in FIGS. 1 and 2 the rear end of the motor car is provided with a hollow chromium-plated ornamental strip 10 extending transversely and horizontally below the top 11 of the luggage compartment indicated in FIG. 2 by dash-dotted lines and below the strip 10 there is provided a pocket or recess 12 giving access to the tubular filling portion 13 of the fuel tank 14 mounted in the rear end of the motor vehicle. This recess 12 is confined by an upper concave wall 15 extending from the strip 10 forwardly and downwardly into contact with a horizontal partition 15 confining the recess 12 at the bottom thereof. The partition 15 is provided with a hole through which the tubular filling portion 13 of the fuel tank 14 extends upwardly and rearwardly, the top end of the tubular portion 13 being closed by a removable cover 17 accommodated within the recess 12. A lid 18 is mounted on the body of the vehicle for pivotal movement between a closed position in which it closes the recess 12 and an open position in which it affords access to the recess. In the embodiment shown, the pivotal axis of the lid is a horizontal axis established by a pair of horizontal co-axial pivot pins 19, each extending through a lateral, vertical, inwardly extending flange 20 of the lid and through a bracket 21 fixed to an upstanding flange 22 provided on an upwardly inclined outer section 23 of the partition 15. The flange 22 is fixed to a rear end wall section 24 of the body forming the rear wall of a horizontal transverse hollow beam 25 extending behind the fuel tank 14. A handle 26 is mounted on the outside of the lid 18 near the top thereof permitting the lid to be swung outwardly and rearwardly into the open position indicated in FIG. 2 by dash-dotted lines. In this open position the lower section of the lid below its pivotal axis abuts against the brackets 21 and is held thereby in a slightly inclined position affording easy access to the cover 17 for the removal thereof. The cover may then be placed upon a rest provided on the inside of the lid by suitable stops 27. Moreover, the lid on its outside is provided with means 28 for the attachment of a license plate 29. The rear bumper 30 indicated in FIG. 2 by dash-dotted lines extends below the lid 18 in its opened position.

For the purpose of my invention I have provided spring means which are so disposed as to exert upon the lid a closing couple which decreases, as the lid is opened, to a minimum which is insufficient to overcome frictional resistance but is sufficient to close the lid, when the frictional resistance is reduced by vibration, such as occurs during travel of the motor vehicle. In the embodiment shown these spring means comprises a pair of helical torsional springs 31, each spring having end sections 32 and 33 extending tangentially to the helix of the spring, one end section 33 of each spring being anchored to the lid 18 and the other end section 32 of the spring being anchored to the body of the vehicle. Preferably, the two springs are disposed co-axially to each other and symmetrically with respect to the vertical central longitudinal plane of the vehicle indicated in FIG. 1 by the arrows II—II.

Two pairs of brackets are provided, one bracket 34 of each pair being fixed to the inside of the lid 18 and the other bracket 35 of the pair being fixed to the inclined section 23 of the partition 15. Each torsional spring 31 is so biased as to tend to spread the end sections 32, 33 apart. Each bracket 34, 35 is U-shaped, the web 36 being welded to the supporting sheet metal member 18 or 23, whereas the arms 37 and 38 of the bracket are provided with apertures in which a bent portion 39 of the end section of the spring, such as 32, is journaled. Moreover, a tongue 40 has been punched out of the arm 38 and has been bent upwardly into engagement with the end section 32 of the spring to thereby prevent disengagement of the end section 39 from the bracket 35.

The brackets which may be adjustably mounted on the partition 23 and on the lid 18, respectively, are so disposed that a line 41 connecting the bearing points of the brackets 34 and 35 is so disposed with respect to the pivot pins 19 that the couple produced by the springs and tending to lift and close the lid decreases as the lid is lowered to the open position to a minimum insufficient to overcome the total weight of the lid 18 and of the cover 17 placed thereon but is sufficient to swing the lid upwardly towards the closed position, when the cover 17 is removed from the lid. The force exerted by the spring upon the lid 18 produces friction between the pins 19 and the brackets 21 and, in an alternative embodiment of my invention, the minimum of the closing couple is insufficient to overcome this frictional resistance. Should the filling station attendant fail to close the lid, however, after the cover 17 has been fixed to the tubular portion 13, the vibration occurring when the vehicle is started again will so reduce the friction of the pins 19 that the couple produced by the springs will be sufficient to lift and to close the lid.

As the rest 27 offers a convenient spot for the filling station attendant to place the cover 17 on, the attendant, should he forget to place the cover 17 back in position on the tubular portion 13, will be reminded to do so when attempting to close the lid 18.

If desired, the distance between the line 41 and the pivotal axis of the lid 18 may be adjusted by providing bracket 21 with an adjustable stop for engagement by the lower portion of lid 18 in opened position.

My novel lid 18 controlled by biased springs affords easy access to the tubular tank portion 13 without requiring any lock and will keep the license plate 29 in clearly visible position during the travel of the vehicle.

Once the lid has been brought into its open position, it will stay put as long as the cover 17 is placed thereon and/or as long as the vehicle is at rest, depending on the distance between line 41 and the pivotal axis of the lid. This distance may be so dimensioned that the lid will close immediately when it is relieved of the weight of the cover 17 placed thereon or, alternatively, such distance may be so dimensioned that the lid will stay in open position when the cover 17 is removed therefrom until the vehicle is started thereby causing reduction of the friction of pivot pins 19 by the vibration of the vehicle.

From the foregoing it will be seen that this invention is one well adapted to attain all of the ends and objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle, the combination comprising a fuel tank having a portion provided with a filling opening, a removable cover for said opening, a recess provided in the body of the vehicle accommodating said portion and said cover, a lid mounted on said body for up and down movement about a pivot axis between an upper closed position in which it closes said recess and a lower open position in which it affords access to said recess, spring means connecting said lid and said body and tending to move said lid into said closing position, the line connecting the points at which said spring means is anchored to said lid and said body being so disposed with respect to said pivotal axis as to produce a closing coupled which decreases as the lid is lowered to said open position, to a minimum insufficient to overcome the total weight of said lid and of said cover, when placed on said lid, but sufficient to swing said lid upwardly towards said closing position, when said cover is removed from said lid.

2. In a motor vehicle the combination comprising a fuel tank having a portion provided with a filling opening, a removable cover for said opening, a recess provided in the body of the vehicle accommodating said portion and said cover, a lid mounted on said body for up and down movement about a pivotal axis between an upper closed position in which it closes said recess and a lower open position in which it affords access to said recess, spring means connecting said lid and said body and tending to lift said lid into said closing position, the line connecting the points at which said spring means is anchored to said lid and said body being disposed above said pivotal axis so that said spring means produces a closing couple decreasing, as the lid is lowered to open position, said spring and said line being so constructed and arranged that said closing couple decreases to a minimum insufficient to overcome frictional resistance and the weight of the lid but sufficient to overcome said weight and to lift said lid into said closed position, when said frictional resistance is reduced by vibration.

3. The combination claimed in claim 1 in which said pivotal axis extends horizontally below said line.

4. The combination claimed in claim 1 in which said lid is provided with a rest for said cover.

5. The combination claimed in claim 2 in which said spring means includes a helical torsional spring having end sections extending tangentially to the helix of said spring, one end section being anchored to said lid and the other end section being anchored to said body, said torsional spring being biased to tend to spread said end sections apart.

6. The combination claimed in claim 2 in which said spring means includes a pair of helical torsional springs, each spring having end sections extending tangentially to the helix of said spring, said combination further comprising two pairs of brackets, one bracket of each pair being fixed to said body and the other bracket of each pair being fixed to said lid, each of said springs having one of said end sections pivotally connected to one of said brackets fixed to said body and having its other end section pivotally connected to one of said brackets fixed to said lid.

7. The combination claimed in claim 6 in which each of said brackets is U-shaped, the arms of said bracket being provided with registering apertures, each end section of said springs having a bent portion journaled in said apertures, said bracket being provided with a tongue forming a stop preventing disengagement of said end section from said bracket.

References Cited in the file of this patent

UNITED STATES PATENTS

| | | |
|---|---|---|
| 2,846,261 | Nickles | Aug. 5, 1958 |
| 2,893,779 | Bayley | July 7, 1959 |